(12) United States Patent
Farese et al.

(10) Patent No.: US 8,156,970 B2
(45) Date of Patent: Apr. 17, 2012

(54) TEMPERATURE-COMPENSATED DISPENSING OF COMPRESSED GASES

(75) Inventors: David John Farese, Riegelsville, PA (US); Joseph Perry Cohen, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 439 days.

(21) Appl. No.: 12/469,912

(22) Filed: May 21, 2009

(65) Prior Publication Data

US 2009/0236006 A1    Sep. 24, 2009

Related U.S. Application Data

(63) Continuation-in-part of application No. 11/247,566, filed on Oct. 10, 2005, now abandoned.

(51) Int. Cl.
  *B65B 31/00* (2006.01)
(52) U.S. Cl. ............... 141/94; 141/4; 141/197; 141/236
(58) Field of Classification Search ............... 141/4, 94, 141/192, 197, 234, 236
  See application file for complete search history.

(56) References Cited

U.S. PATENT DOCUMENTS

| | | | |
|---|---|---|---|
| 3,844,306 A | 10/1974 | Hill | |
| 4,523,548 A | 6/1985 | Engel et al. | |
| 5,406,988 A | 4/1995 | Hopkins | |
| 5,409,046 A * | 4/1995 | Swenson et al. | ............... 141/197 |
| 5,454,408 A | 10/1995 | Dibella et al. | |
| 5,597,020 A | 1/1997 | Miller et al. | |
| 5,881,779 A | 3/1999 | Kountz et al. | |
| 5,901,758 A | 5/1999 | Hwang et al. | |
| 6,360,793 B1 | 3/2002 | Sugano et al. | |
| 6,598,624 B2 | 7/2003 | Togasawa et al. | |
| 6,619,336 B2 | 9/2003 | Cohen et al. | |
| 6,655,422 B2 * | 12/2003 | Shock | ........................ 141/197 |
| 6,708,573 B1 | 3/2004 | Cohen et al. | |
| 6,755,225 B1 * | 6/2004 | Niedwiecki et al. | .......... 141/231 |
| 6,779,568 B2 | 8/2004 | Borck | |
| 6,786,245 B1 | 9/2004 | Eichelberger et al. | |
| 7,059,364 B2 * | 6/2006 | Kountz et al. | ..................... 141/4 |
| 7,178,565 B2 | 2/2007 | Eichelberger et al. | |
| 7,328,726 B2 * | 2/2008 | Cohen et al. | ..................... 141/94 |
| 7,568,507 B2 * | 8/2009 | Farese et al. | ..................... 141/95 |
| 7,921,883 B2 * | 4/2011 | Cohen et al. | ..................... 141/95 |
| 2003/0164202 A1 | 9/2003 | Graham et al. | |
| 2004/0118476 A1 | 6/2004 | Borck | |
| 2007/0079891 A1 | 4/2007 | Farese et al. | |

* cited by examiner

*Primary Examiner* — Gregory Huson
*Assistant Examiner* — Nicolas A Arnett
(74) *Attorney, Agent, or Firm* — Bryan C. Hoke, Jr.

(57) ABSTRACT

Method for dispensing a gas comprising (a) providing a gas storage system containing pressurized gas and having at least first and second gas storage volumes, first and second flow control valves in flow communication with the first and second gas storage volumes, respectively, wherein each flow control valve is initially closed, and wherein the first gas storage volume has a smaller volumetric capacity than the second gas storage volume; (b) selecting a reference temperature; (c) measuring the ambient temperature; (d) providing a gas receiving vessel and placing it in flow communication with each flow control valve and with the gas storage system; and (e) initiating delivery of the gas by (i) opening the first flow control valve when the ambient temperature is equal to or greater than the reference temperature or (ii) opening the second flow control valve when the ambient temperature is less than the reference temperature.

14 Claims, 2 Drawing Sheets

TEMPERATURE-COMPENSATED DISPENSING OF COMPRESSED GASES

CROSS-REFERENCE TO RELATED APPLICATIONS

This application is a continuation-in-part of application Ser. No. 11/247,566 filed on Oct. 10, 2005, which application is incorporated herein by reference.

BACKGROUND OF THE INVENTION

The dispensing of compressed gas from a high-pressure storage system to a lower-pressure receiving vessel or tank is known in the art for various applications such as supplying fuel to compressed natural gas (CNG)-powered or hydrogen-powered vehicles. When compressed gas is transferred from a high-pressure storage vessel to a lower-pressure vessel, the temperature of the gas in the system changes as a function of the thermodynamic properties of the gas and the heat transfer characteristics of the system. Dispensing systems may be designed to control these temperature changes to ensure that the gas transfer process is timely and efficient.

Cascade filling processes that employ multiple high-pressure storage vessels to charge a lower pressure-receiving vessel are known in the prior art, as exemplified in Borck U.S. Pat. No. 6,779,568. The '568 patent discloses that, for a constant filling time, the peak temperature of the gas in the receiving tank will be lower when a lower pressure storage vessel is used first during the cascade filling process. Thus, the '568 patent teaches controlling the order in which the storage vessels are utilized based on the difference in pressure within those storage banks.

The prior art also teaches that the temperature rise in a receiving tank can be limited by adjusting the filling rate from the high-pressure storage vessels, especially at the start of the filling process when the rate of temperature increases the greatest, as exemplified in Hwang, et al. U.S. Pat. No. 5,901,758 and Togasawa, et al. U.S. Pat. No. 6,598,624.

A further prior art approach for limiting or controlling the temperature rise in a receiving tank is to utilize additional hardware, such as a heat exchanger to cool the flowing gas stream from the high-pressure storage vessels, upstream of the receiving tank. The use of such additional hardware is disclosed in Sugano, et al. U.S. Pat. No. 6,360,793 and Cohen, et al. U.S. Pat. No. 6,619,336.

High-pressure gas storage and dispensing systems are usually installed outdoors and are subjected to wide ranges of ambient temperatures. Although the above prior art disclosures focus on the thermal impact that the filling process has on the receiving tank, none of those disclosures takes into account, or even recognizes the need to take into account, the impact of ambient temperature on the compressed gas within and leaving the compressed gas storage system during the process of filling a receiving tank. Based on the limitations of these prior art approaches for storing and transferring compressed gas from high-pressure storage systems to a lower-pressure receiving vessel, there is a need in the art for improved methods and systems for controlling the amount of cooling of the compressed gas within the storage system during transfer from the storage system to a receiving vessel based on ambient temperature conditions. This need is addressed by the embodiments of the invention described below and defined by the claims that follow.

BRIEF SUMMARY OF THE INVENTION

An embodiment of the invention relates to a method for dispensing gas from a gas storage system to a gas receiving vessel, wherein the method comprises (a) providing the gas storage system comprising at least a first gas storage volume, a first flow control valve in flow communication with the first gas storage volume, a second gas storage volume, and a second flow control valve in flow communication the second gas storage volume, wherein each gas storage volume contains pressurized gas, wherein each flow control valve is initially closed, and wherein the first gas storage volume has a smaller volumetric capacity than the second gas storage volume;
(b) selecting a reference temperature;
(c) measuring the ambient temperature adjacent the gas storage system;
(d) providing the gas receiving vessel and connecting the gas receiving vessel to the gas storage system such that the gas receiving vessel is in flow communication with each flow control valve; and
(e) initiating delivery of the gas from the gas storage system to the gas receiving vessel by
   (i) opening the first flow control valve when the ambient temperature is equal to or greater than the reference temperature or
   (ii) opening the second flow control valve when the ambient temperature is less than the reference temperature.

Another embodiment of the invention is directed to a method for dispensing gas from a gas storage system to a gas receiving vessel, wherein the method comprises (a) providing the gas storage system comprising a plurality of gas storage volumes, a plurality of flow control valves wherein each gas storage volume has a flow control valve in flow communication therewith, wherein each gas storage volume contains pressurized gas, wherein each flow control valve is initially closed, and wherein the volumetric capacities of the plurality of gas storage volumes are essentially equal;
(b) selecting a reference temperature;
(c) measuring the ambient temperature adjacent the gas storage system;
(d) providing the gas receiving vessel and connecting the gas receiving vessel to the gas storage system such that the gas receiving vessel is in flow communication with each of the plurality of flow control valves; and
(e) initiating delivery of the gas from the gas storage system to the gas receiving vessel by
   (i) opening a first number of the plurality of flow control valves when the ambient temperature is equal to or greater than the reference temperature or
   (ii) opening a second number of gas flow control valves when the ambient temperature is less than the reference temperature;

wherein the second number is greater than the first number.

A related embodiment of the invention includes a system for dispensing gas from a gas storage system to a gas receiving vessel comprising (a) a gas storage system comprising at least a first gas storage volume, a first flow control valve in flow communication with the first gas storage volume, a second gas storage volume, and a second flow control valve in flow communication the second gas storage volume, wherein each gas storage volume is adapted to contain pressurized gas, wherein each flow control valve is adapted to operate in the closed, fully open, and partially open positions, and wherein the first gas storage volume has a smaller volumetric capacity than the second gas storage volume;

(b) a temperature measuring sensor adapted to measuring the ambient temperature adjacent the gas storage system;

(d) a gas receiving vessel adapted for connection to the gas storage system such that the gas receiving vessel is in flow communication with each flow control valve; and (e) a programmable logic controller adapted to receive a temperature-proportional signal from the ambient temperature measuring sensor, to compare the ambient temperature with a stored reference temperature, and to operate the flow control valves such that
   (i) when the ambient temperature is equal to or greater than the reference temperature, the first flow control valve is opened and
   (ii) when the ambient temperature is less than the reference temperature, the second flow control valve is opened.

Another related embodiment of the invention relates to a system for dispensing gas from a gas storage system to a gas receiving vessel comprising (a) a gas storage system comprising a plurality of gas storage volumes, a plurality of flow control valves wherein each gas storage volume has a flow control valve in flow communication therewith, wherein each gas storage volume is adapted to contain pressurized gas, wherein the volumetric capacities of the plurality of gas storage volumes are essentially equal, and wherein each flow control valve is adapted to operate in the closed, fully open, and partially open positions;

(b) a temperature measuring sensor adapted to measuring the ambient temperature adjacent the gas storage system;

(d) a gas receiving vessel adapted for connection to the gas storage system such that the gas receiving vessel is in flow communication with each flow control valve; and (e) a programmable logic controller adapted to receive a temperature-proportional signal from the ambient temperature measuring sensor, to compare the ambient temperature with a stored reference temperature, and to operate the flow control valves by
   (i) opening a first number of the plurality of flow control valves when the ambient temperature is equal to or greater than the reference temperature or
   (ii) opening a second number of gas flow control valves when the ambient temperature is less than the reference temperature;
wherein the second number is greater than the first number.

BRIEF DESCRIPTION OF SEVERAL VIEWS OF THE DRAWINGS

The invention will be described by way of example with reference to the accompanying drawings, in which.

DETAILED DESCRIPTION OF THE INVENTION

Figure 1:
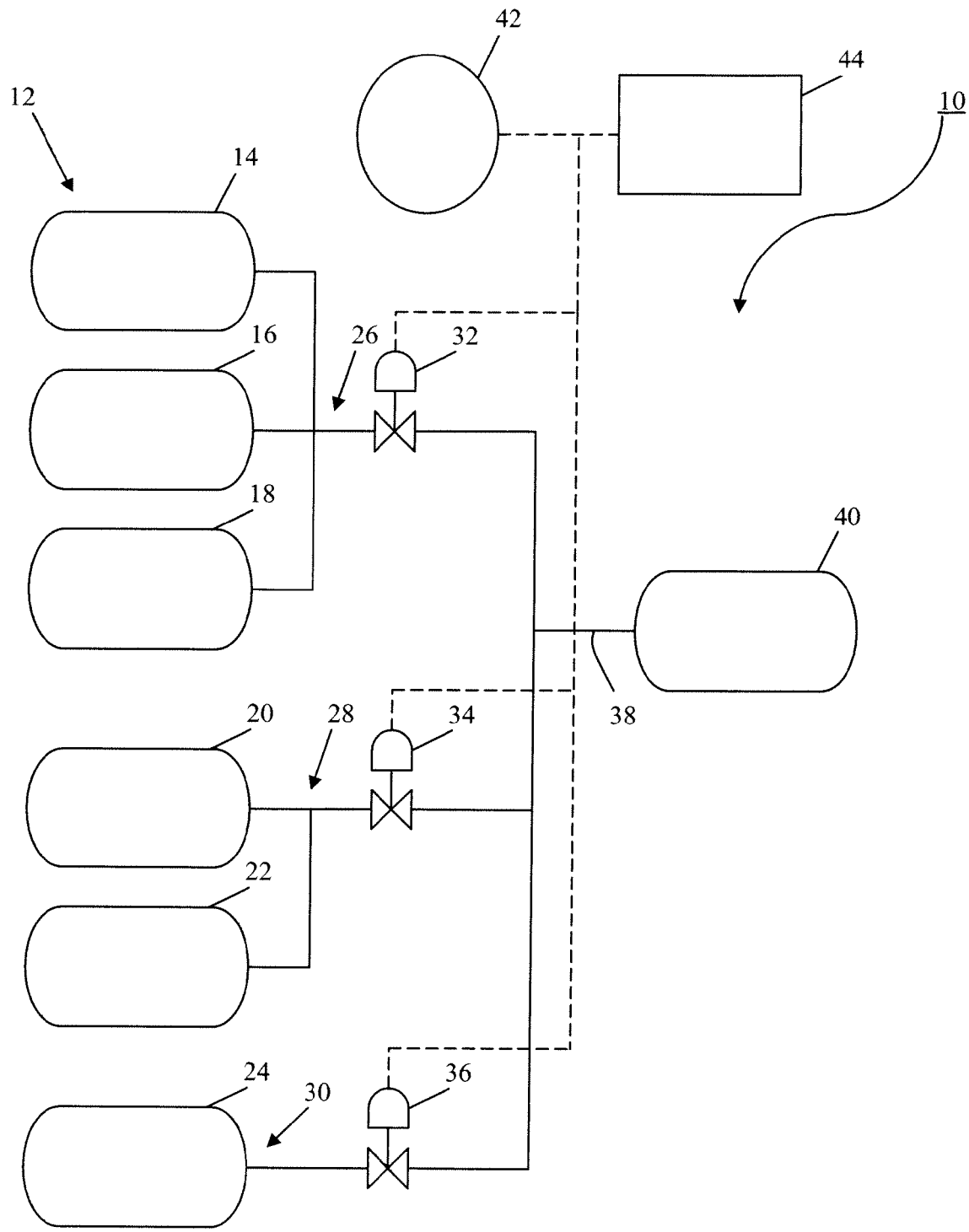
FIG. 1 is a schematic view showing a system for controlling the temperature of compressed gas being transferred from one or more high-pressure storage vessels to a receiving vessel in accordance with one embodiment of this invention.

The embodiments of this invention relate to methods and systems for dispensing gas from a high-pressure fluid or gas storage system to a receiving vessel by controlling the temperature of the gas in the storage system during gas transfer to a receiving vessel. By using these embodiments, the temperature of the components in the storage system, i.e., vessels, piping, valves, and other hardware, can be maintained at temperatures above an allowable minimum temperature below which the system components may be subject to mechanical failure. The minimum safe operating temperature for components in a high-pressure gas storage system generally depend upon the materials of construction and design features of the system. A minimum safe operating temperature may be, for example, −40° F. (−40° C.). At low ambient temperatures, the impact of isentropic expansion cooling due to the reduction in pressure within the storage system can be significant, and the temperature within the storage and delivery system can approach this minimum safe operating temperature.

Compressed natural gas (CNG) and hydrogen are the typical components dispensed from these storage systems, which are usually installed outdoors and are therefore subjected to wide ranges of ambient temperatures. Ambient temperatures are well above the critical temperature of hydrogen (−240° C. or −400° F.) and methane (−83° C. or −117° F.), so that these components typically are stored and dispensed as supercritical fluids rather than gases according to strict thermodynamic definitions. However, the terms "gas" and "compressed gas" are usually used in the art as generic terms for both gases and supercritical fluids. In the present disclosure, the terms "gas" and "compressed gas" may be used interchangeably and are meant to include elements and compounds in both thermodynamic states of gas and supercritical fluid. The generic term "fluid" as used herein includes both thermodynamic states of gas and supercritical fluid.

A gas dispensing system is defined as a pressurized gas storage and supply system for providing pressurized gas to a portable receiving tank or vessel. The gas dispensing system includes a connector to couple with the receiving vessel for gas transfer and an appropriate safety interlock system to ensure safe operation during the filling step. The receiving tank or vessel typically is part of a vehicle such as a car, truck or bus.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

In the present disclosure, the term "in flow communication with" as applied to a first and second region or volume means that a fluid can flow from the first region or volume to the second region or volume through connecting piping and/or an intermediate region or volume. The terms "connecting" and "connected to" as applied to a first and second region or volume means that a fluid can flow from the first region or volume to the second region or volume through connecting piping. The term "in flow communication with" applies to systems in which a valve is installed between the first and second region or volume such that (1) gas flow actually occurs, i.e., when the valve is open, or (2) gas flow can potentially occur, i.e., when the valve is closed and has the potential for being opened.

The adjective "open" when applied to a flow control valve means any position of the valve flow control member, e.g., a valve stem, diaphragm, butterfly, rotating ball, and the like, that allows gas to flow through the valve. The adjective "open" thus may apply to a partially-open or fully-open flow control valve. The verbs "open" and "opening" mean the act of moving the valve flow control member from a closed position to a partially open position or to a fully open position. The term "closed" has the usual meaning of a valve in which no gas flow occurs because the flow control member is in the closed position.

The term "volumetric capacity" when applied to a gas storage vessel or a gas storage volume means the volume within the gas storage vessel or a gas storage volume. A gas storage volume is defined as a single gas storage vessel or a plurality of gas storage vessels wherein each vessel is in flow communication with the other vessels.

The embodiments of the invention relate to the phenomenon wherein gas flowing from a high-pressure storage volume (which may comprise one or more vessels) to a lower-pressure receiving vessel is cooled by isentropic pressure decrease in the storage volume. As a result, the gas leaving the storage volume and the storage volume itself are below the initial ambient temperature of the storage volume. The temperature decrease and the degree of cooling of the gas are related to the pressure decrease in the storage volume according to known thermodynamic principles. The pressure decrease in the storage volume is proportional to the volumetric ratio of the receiving vessel to the storage volume, and the pressure decrease in the storage volume increases as this volumetric ratio increases. Thus the temperature drop in the storage volume increases as the volumetric ratio of the receiving vessel to the storage volume increases. For a receiving vessel with a given volume, therefore, decreasing the size of the storage volume will result in a greater temperature drop in the gas storage volume.

In gas dispensing systems, cooling of the gas being transferred to the receiving tank may be desirable. The cooling of the gas in the gas storage vessel or vessels due to isentropically decreasing pressure is acceptable as long as the temperature of the storage system components (i.e., vessels, piping, valves, and other hardware) is above the minimum safe operating temperature. At higher ambient temperatures, more cooling of the gas in the storage volume is possible before the minimum safe operating temperature is approached, and the minimum safe operating temperature may never be reached during gas transfer at higher ambient temperatures. At lower ambient temperatures, however, the possibility of reaching the minimum safe operating temperature increases, and operational steps may be required in certain situations to avoid reaching the minimum safe operating temperature of the gas storage system. The embodiments of the present invention address this requirement.

The allowable pressure decrease in a storage volume is determined by two parameters, namely, the ambient temperature surrounding the gas storage system and the minimum safe operating temperature. As discussed above, the minimum safe operating temperature for components in a high-pressure gas storage system typically depends on materials of construction and design features, and this temperature may be unique to each to gas storage system design. A typical minimum safe operating temperature is, for example, −40° F. (−40° C.).

An exemplary embodiment of the invention is illustrated in FIG. 1, which is a schematic flow diagram of a storage and delivery system for compressed gas in accordance with this embodiment. Storage and delivery or gas dispensing system 10 includes a storage section 12 and a plurality of compressed gas storage vessels 14, 16, 18, 20, 22, and 24. The number of storage vessels in the storage and delivery system may be varied; the exact number of vessels is not a limitation on the embodiments of this invention. The storage vessels may be filled to high pressures up to, for example, 480 barg (7000 psig).

As can be seen in FIG. 1, the six storage vessels are arranged in three storage banks 26, 28, and 30 and have different total volumes. The storage bank 26 includes three storage vessels 14, 16, and 18; the second storage bank 28 includes two storage vessels 20 and 22 and the third storage bank 30 includes the single storage vessel 24. Thus, each of the storage banks 26, 28, and 30 has a different compressed gas storage volume or volumetric capacity.

Still referring to FIG. 1, each bank of storage vessels is in flow communication with a separate flow control device. The flow control devices may be gas flow control valves 32, 34, and 36, respectively, each of which typically are operable either in a fully-opened or fully-closed position. Any of the valves may be operable in partially-open positions to reduce gas flow rates if desired. As can be seen in FIG. 1, the flow control valve 32 controls the flow of compressed gas from the three storage vessels 14, 16, and 18 in bank 26 as a unit and directs that flow into a supply line 38 for delivery to a receiving tank 40. In a similar manner, the flow control valve 34 controls the flow of compressed gas from the storage vessels 20 and 22, which constitute the second bank 28 of storage vessels. When this second valve 34 is opened, it places the second bank of storage vessels in flow communication with the supply line 38 for delivery of compressed gas to the receiving tank 40. Control valve 36 controls the flow of compressed gas from the single storage vessel 24, which constitutes the third bank 30. When the valve 36 is opened, it directs the flow of compressed gas through supply line 38 to the receiving tank.

When each of the banks 28, 30, and 32 of storage vessels is placed in flow communication with receiving vessel 40, the pressure in the storage vessels communicating with the receiving vessel decreases as gas flows from the storage vessels into the receiving vessel until the pressure in the storage vessels communicating with the receiving vessel equalize with the internal pressure of the receiving vessel. At that point in time the gas flow from the bank(s) of storage vessels communicating with the receiving vessel ends. Alternatively, gas flow may be terminated before full equalization by closing the appropriate valves.

As can be seen in FIG. 1, the group of two storage vessels 20, 22 constituting the second bank 28 has twice the total gas storage volume or volumetric capacity as the single storage vessel 24 constituting the third bank 30, and the three storage vessels 14, 16 and 18 constituting the first bank 28 has three times the total storage volume as the single storage vessel 24 constituting the third bank 30. Thus the gas storage volume that communicates with the receiving vessel 40 through the supply line 38 can be varied by selectively opening one or more of the flow control valves 32, 34, and 36.

Still referring to FIG. 1, a temperature measuring device or sensor 42 is provided to measure the ambient temperature adjacent the gas storage and delivery system 10 and is adapted for communicating temperature-proportional signals to programmable logic controller 44. The programmable logic controller 44 operates the flow control valves 32, 34, and/or 36 in a programmed sequence based upon the ambient temperature measured by the temperature measuring device 42. In embodiments of this invention, the programmable logic controller 44 includes a reference temperature that is compared to the measured ambient temperature, and the relationship between these two temperatures is utilized by the programmable logic controller 44 to control the opening or sequencing of the one or more of the flow control valves 32, 34, and 36. Alternatively, programmable logic controller 44 may operate the flow control valves 32, 34, and 36 so that one or more of the valves are in the partially-opened position to control the gas flow rate or flow rates at less than the maximum flow rate or rates when the valves are fully open.

The reference temperature may be selected or preset by the designer and/or operator of the gas storage and delivery system 10 based on the specific system design characteristics and/or operating experience with the system. These typically include, for example, the heat transfer characteristics of the storage vessel and piping system, vessel size, and other features that can affect gas flow rate and pressure drop. The reference temperature typically is in the range of 0° F. to 50° F., inclusive, although a reference temperature outside this range may be used if desired.

Programmable logic controller 44 can be programmed to vary the number of valves that are opened at any given time, as well as the order in which those valves are opened, depending upon the desired or allowable amount of cooling of the compressed gas being transferred to the receiving tank 40. In one embodiment, the storage and delivery system 10 is designed to deliver the coldest gas possible to the receiving vessel 40 when the ambient temperature measured by the device 42 is higher than the reference temperature in the programmable logic controller 44, and the cooling of the compressed gas transferred to the receiving tank 40 is desirably minimized when the ambient temperature measured by the device 42 is less than the reference temperature in the programmable logic controller 44.

In particular, the greater the pressure decrease that occurs in the supply vessel, the greater the cooling effect that occurs in the supply vessel. The greatest pressure decrease is achieved by delivering compressed gas to the receiving vessel 40 from the smallest available volume storage vessel (i.e., 24) in the storage section 12 of the system.

Figure 2:
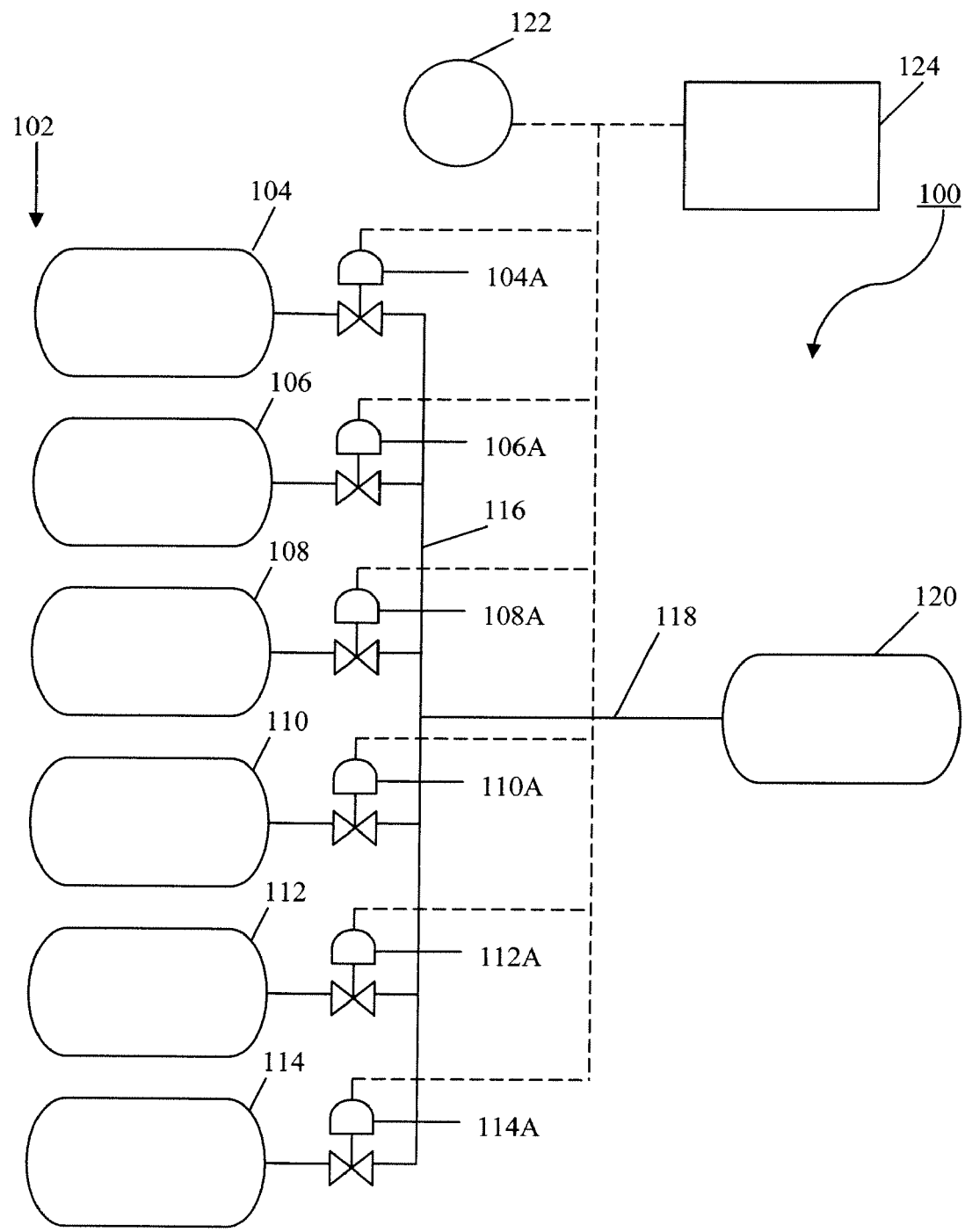
FIG. 2 is a schematic view of a system for controlling the temperature of compressed gas being transferred from one or more high-pressure storage vessels to a receiving vessel in accordance with a second embodiment of this invention.

A second embodiment of a storage and delivery system is illustrated in FIG. 2. The storage and delivery system 100 includes a storage section 102 having a plurality of storage vessels or cylinders 104, 106, 108, 110, 112, and 114. Although the storage section 102 is illustrated as including six separate storage vessels, the number of vessels can be varied in accordance with other embodiments of this invention.

Still referring to FIG. 2, each of the storage vessels is in flow communication with a separate gas flow control valve 104A, 106A, 108A, 110A, 112A, and 114A, respectively. Any of these valves can be operated as on-off valves or alternatively can be operated in the partially-opened position to control the gas flow rate or flow rates at less than the maximum flow rate or rates when the valves are fully open.

Each of the flow control valves flow control is in flow communication with a common feed line or manifold 116, which is in flow communication with a supply line 118 for directing the flow of compressed gas from one or more of the storage vessels 104, 106, 108, 110, 112, and 114 to a receiving tank or vessel 120.

Still referring to FIG. 2, a temperature measuring device 122 measures the ambient temperature in the same manner as the temperature measuring device 42 employed in the storage and delivery system 10. Also, the storage and delivery system 100 includes a programmable logic controller 124 including a reference temperature stored therein. This programmable logic controller 124 may be of the same type as the programmable logic controller 44 of storage and delivery system 10, but the controller is programmed to operate the valves 104A, 106A, 108A, 110A, 112A, and 114A as described below.

In accordance with the operation of the storage and delivery system 100, the ambient temperature measured by the temperature measuring device 122 is compared to the reference temperature in the programmable logic controller, and based upon that comparison, the programmable logic controller operates the various control valves 104A, 106A, 108A, 110A, 112A, and 114A in a programmed manner to aid in controlling the temperature of compressed gas being transferred from one or more of the high-pressure storage vessels, 104, 106, 108, 110, 112, and 114 to the receiving tank or vessel 120. As discussed above, the reference temperature may be selected or preset by the designer and/or operator of the gas storage and delivery system 10 based on the specific system design characteristics and/or operating experience with the system. These may include, for example, the heat transfer characteristics of the storage vessel and piping system as well as other characteristics that may affect gas flow rate and pressure drop.

For example, when the ambient temperature measured by the device 122 is greater than a reference temperature in the programmed logic controller 124 of 10° F.), the compressed gas being transferred to the receiving tank or vessel 120 may be cooled to the maximum extent, and the programmable logic controller in this case would be programmed to selectively open and close each of the valves 104A, 106A, 108A, 110A, 112A, and 114A, one valve at a time, i.e., sequentially. In this manner, at any specific time in the gas transfer operation only one of the storage tanks 104, 106, 108, 110, 112, and 114 will be directing the flow of compressed gas into the receiving tank or vessel 120. The volumetric capacities of the storage vessels 104, 106, 108, 110, 112, and 114 may be essentially equal, which means that the difference between the volumes of any two vessels is less than 5% of the average of the volumes of the two vessels.

In this mode of operation, the order in which the individual flow control valves are opened is not important, but it is desirable that only one valve at a time be opened and closed, i.e., that the valves be operated sequentially. This provides for the greatest degree of pressure decrease in the storage vessels until full or partial pressure equalization takes place with the receiving vessel 120, thereby delivering the coldest gas possible by taking maximum advantage of the cooling resulting from the gas pressure decrease in each storage vessel.

The programmable logic controller 124 can be programmed to override the above operating sequence (or any other sequence being carried out) as desired. However, when the ambient temperature is less than the reference temperature (for example, less than a reference temperature of 10° F.), this generally indicates that the compressed gas being transferred from the storage section 102 to the receiving tank or vessel 120 does not require significant cooling. Accordingly, the programmable logic controller 124 can be programmed to open more than one control valve at a time. For example, control valves 104A and 106A can be opened first when the temperature is less than the reference temperature of 10° F. but more than a second reference temperature of 1° F. Another valve (for example, control valve 108A) could be opened if the temperature falls below 1° F. Ultimately, all of the valves can be opened at the same time at a third reference temperature of −30° F. to minimize the degree of cooling in the gas storage system.

The operation of the storage and delivery systems 10 and 100 described above, including the sequence of valve operation, may be varied within wide limits. A common feature of the embodiments of this invention is that the systems are designed to control the temperature of the compressed gas being transferred from one or more high-pressure storage vessels to a receiving vessel based upon ambient temperature conditions in order to protect the storage system against possible damage at temperatures at or below the minimum safe operating temperature.

Other embodiments of the invention are possible. For example, the storage and delivery system 10, rather than employing three separate groups of storage vessels in which each storage vessel has essentially the same volume, can be designed so that each of the groups 26, 28, and 30 is replaced by a single storage vessel, with the storage volume of each vessel differing from the storage volume in every other vessel. For example, the bank 26 of vessels 14, 16, and 18 could be replaced by a single storage vessel having a storage volume corresponding to the total storage volume provided by the storage vessels 14, 16, and 18. Likewise, the storage vessels 20 and 22, constituting the second bank 28 of storage vessels can be replaced by a single storage vessel having a storage volume equivalent to the total storage volume of the vessels 20 and 22. In this embodiment the storage vessel 24 will remain, presenting the desired storage vessel volume to be controlled by the supply valve 36.

In the illustrative embodiments described above, the flow control valves are operated in either fully-open or fully-closed positions. Other embodiments are possible in which a flow control valve is operated in the partially-open position to reduce the gas flow rate under certain selected conditions. In an alternative embodiment, for example, the flow rate of gas being transferred at a very low ambient temperature may be reduced by partially closing the flow control valve so that the rate of pressure decrease and the degree of cooling in the storage vessel are reduced. This alternative embodiment utilizes the system of FIG. 1 in which the gas storage banks 26, 28, and 30 are in flow communication with the flow control valves 32, 34, and 36, respectively, and these valves are in flow communication with receiving tank 40. A primary reference temperature is selected or preset and stored in the programmable logic controller 44 similar to the embodiments described above. The primary reference temperature may be in the range of 0° F. to 50° F., inclusive. In addition, a secondary reference temperature is selected or preset and stored in the programmable logic controller 44 wherein the secondary reference temperature is less than the primary reference temperature. The secondary reference temperature may be in the range of 0° F. to −40° F., inclusive.

The system of FIG. 1 is operated in this alternative embodiment as follows. If the ambient temperature measured by the temperature sensor 42 is at or above the primary reference temperature, the flow control valve 36 is fully opened by the programmable logic controller 44, and gas flows from the storage vessel 24 to the receiving tank 40. In this case, maximum cooling occurs due to the rapid pressure decrease in the storage tank 24. The gas flow continues until the pressure in the receiving tank 40 reaches a desired pressure. If there is insufficient gas in the storage vessel 24 to provide the desired pressure in the receiving tank, the programmable logic controller 44 closes valve 36 and fully opens the flow control valve 34. Additional gas flows into the receiving tank 40, but the degree of cooling is less than in the previous step. When the pressure in the receiving tank reaches the desired pressure, the programmable logic controller 44 closes valve 34.

If the ambient temperature measured by the temperature sensor 42 is below the primary reference temperature and at or above the secondary reference temperature, the flow control valve 32 is fully opened by the programmable logic controller 44, and gas flows from the storage bank 26 to the receiving tank 40. In this case, a reduced degree of cooling occurs due to the slower pressure decrease in the storage tanks 14, 16, and 18 when compared with the gas flow from the storage vessel 24 described above. The gas flow continues until the pressure in the receiving tank 40 reaches a desired pressure, and the programmable logic controller 44 closes valve 32.

If the ambient temperature measured by the temperature sensor 42 is below the secondary reference temperature, the flow control valve 32 is partially opened by the programmable logic controller 44, and gas flows at a reduced rate from the storage bank 26 to the receiving tank 40 as compared with the flow when valve 32 is fully open as described above. In this case, a further reduced degree of cooling occurs due to the slower pressure decrease in the storage tanks 14, 16, and 18. The gas flow continues until the pressure in the receiving tank 40 reaches a desired pressure, and the programmable logic controller 44 closes valve 32. This operating mode is selected at very low ambient temperatures to ensure that the temperature in the storage bank 26 is above the minimum safe operating temperature.

In the exemplary embodiment described above, for example, the primary reference temperature may be 20° F. and the secondary reference temperature may be −20° F. Other primary and secondary reference temperatures may be selected as required based on equipment design features and operating parameters.

In another embodiment, the ambient temperature measured by the device 42 may be greater than the reference temperature in the programmable logic controller (e.g., 10° F.), thereby establishing that the cooling of the gas should be maximized as it is being transferred to the receiving vessel 40. The programmable controller 44 will first open valve 36 to establish flow communication only between the storage volume of storage vessel 24 and the receiving vessel 40. The pressure in the storage vessel 24, because this vessel has the smallest storage volume for delivering compressed gas to the receiving vessel 40, decreases to the greatest degree possible in equalizing with the pressure in the receiving vessel, thereby delivering the coldest gas possible by taking maximum advantage of expansion cooling. Next, the programmable logic controller 44 will open the valve 34 to communicate storage vessels 20, 22 of bank 28 with the receiving vessel 40, and thereafter will open control valve 32 for communicating the three storage vessels 14, 16 and 18 of bank 26 with the receiving vessel 40, thereby delivering a lower proportion of the compressed gas to the storage vessel 40 at warmer temperatures.

Alternatively, when the ambient temperature is less than the set point of the programmable logic controller, cooling of the gas during the transfer operation is not desirable. Under these conditions, the programmable logic controller 44 is programmed to open valve 32 first to place supply vessels 14, 16, and 18 of bank 26 in flow communication with the receiving tank 40. The pressure in vessels 14, 16, and 18 does not decrease as much as the pressure would have decreased in storage vessel 24 on a warmer day when the ambient temperature was greater than the reference temperature of the programmable logic controller. The cooling of the compressed gas due to pressure decrease in supply vessels 14, 16, and 18 is therefore minimized.

The storage and delivery methods and systems described above can be used, for example, for the refueling of vehicles powered by compressed natural gas (CNG) or hydrogen in locations where low ambient temperatures could result in damage to gas storage systems by very low temperatures caused by cooling due to pressure decrease in gas storage vessels during operation. The embodiments described above may be useful, for example, at locations having minimum ambient temperatures below about 20° F.

The invention claimed is:

1. A method for dispensing gas from a gas storage system to a gas receiving vessel, wherein the method comprises
    (a) providing the gas storage system comprising a plurality of gas storage volumes, a plurality of flow control valves wherein each gas storage volume has a flow control valve in flow communication therewith, wherein each gas storage volume contains pressurized gas, wherein each flow control valve is initially closed, and wherein the volumetric capacities of the plurality of gas storage volumes are essentially equal;
    (b) selecting a reference temperature;
    (c) measuring the ambient temperature adjacent the gas storage system;
    (d) providing the gas receiving vessel and connecting the gas receiving vessel to the gas storage system such that the gas receiving vessel is in flow communication with each of the plurality of flow control valves; and
    (e) initiating delivery of the gas from the gas storage system to the gas receiving vessel by
        (i) opening a first number of the plurality of flow control valves when the ambient temperature is equal to or greater than the reference temperature or
        (ii) opening a second number of gas flow control valves when the ambient temperature is less than the reference temperature;
    wherein the second number is greater than the first number.

2. The method of claim 1 wherein second number is two or more and the first number is one.

3. The method of claim 1 wherein when the ambient temperature is equal to or greater than the reference temperature, operating two or more of the flow control valves by opening and closing each valve sequentially.

4. The method of claim 1 wherein any of the flow control valves are fully opened in (e).

5. The method of claim 1 wherein the gas comprises methane or hydrogen.

6. The method of claim 1 wherein the reference temperature is in the range of 0° F. to 50° F., inclusive.

7. The method of claim 1 which comprises selecting a secondary reference temperature that is less than the reference temperature of (b) and (iii) when the ambient temperature is equal to or less than less than the secondary reference temperature, partially opening at least one of the second number of gas flow control valves.

8. The method of claim 1 which comprises selecting a secondary reference temperature that is less than the reference temperature of (b) and (iii) when the ambient temperature is equal to or less than less than the secondary reference temperature, opening a third number of gas flow control valves, wherein the third number is greater than the second number.

9. The method of claim 8 wherein the secondary reference temperature is in the range of 0° F. to −40° F., inclusive.

10. A system for dispensing gas from a gas storage system to a gas receiving vessel comprising
    (a) a gas storage system comprising a plurality of gas storage volumes, a plurality of flow control valves wherein each gas storage volume has a flow control valve in flow communication therewith, wherein each gas storage volume is adapted to contain pressurized gas, wherein the volumetric capacities of the plurality of gas storage volumes are essentially equal, and wherein each flow control valve is adapted to operate in the closed, fully open, and partially open positions;
    (b) a temperature measuring sensor adapted to measuring the ambient temperature adjacent the gas storage system;
    (d) a gas receiving vessel adapted for connection to the gas storage system such that the gas receiving vessel is in flow communication with each flow control valve; and
    (e) a programmable logic controller configured to receive a temperature-proportional signal from the ambient temperature measuring sensor, to compare the ambient temperature with a stored reference temperature, and to operate the flow control valves by
        (i) opening a first number of the plurality of flow control valves when the ambient temperature is equal to or greater than the reference temperature or
        (ii) opening a second number of gas flow control valves when the ambient temperature is less than the reference temperature;
    wherein the second number is greater than the first number.

11. The system of claim 10 wherein the programmable logic controller is configured to fully open any of the flow control valves in (e).

12. The method of claim 10 wherein the programmable logic controller is configured to, operating two or more of the flow control valves by opening and closing each valve sequentially when the ambient temperature is equal to or greater than the reference temperature.

13. The system of claim 10 wherein the programmable logic controller is configured to store a secondary reference temperature, to compare the ambient temperature with the stored reference temperature, and to operate the flow control valves such that (iii) when the ambient temperature is equal to or less than less than the secondary reference temperature, partially opening at least one of the second number of gas flow control valves.

14. The system of claim 10 wherein the programmable logic controller is configured to store a secondary reference temperature, to compare the ambient temperature with the stored reference temperature, and to operate the flow control valves such that (iii) when the ambient temperature is equal to or less than less than the secondary reference temperature, opening a third number of gas flow control valves, wherein the third number is greater than the second number.

* * * * *

UNITED STATES PATENT AND TRADEMARK OFFICE
CERTIFICATE OF CORRECTION

PATENT NO. : 8,156,970 B2
APPLICATION NO. : 12/469912
DATED : April 17, 2012
INVENTOR(S) : David John Farese et al.

Page 1 of 1

It is certified that error appears in the above-identified patent and that said Letters Patent is hereby corrected as shown below:

In the Claims:

Column 11, Line 47
In claim 7 delete "less than less than" and insert --less than--

Column 12, Line 53
In claim 14 delete "less than less than" and insert --less than--

Signed and Sealed this
Twenty-first Day of May, 2013

Teresa Stanek Rea
*Acting Director of the United States Patent and Trademark Office*